(12) United States Patent
Dudding et al.

(10) Patent No.: US 6,851,689 B2
(45) Date of Patent: Feb. 8, 2005

(54) VEHICLE SUSPENSION (75) Inventors: Ashley Thomas Dudding, Plainfield, IL (US); Christopher Wayne Forrest, Auburn, IN (US); John Wayne Stuart, Chicago, IL (US); Jason Steby Thomas, Chicago, IL (US); Pedro Ramses Banda Marquez, Downers Grove, IL (US); Mark William Dankow, Ft. Wayne, IN (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 09/793,740

(22) Filed: Feb. 26, 2001

(65) Prior Publication Data

US 2002/0117816 A1 Aug. 29, 2002

(51) Int. Cl.$^7$ ................................................. B60G 3/12
(52) U.S. Cl. ........................ 280/124.128; 280/124.13; 280/124.149
(58) Field of Search ................ 280/124.11, 124.16, 280/124.128, 124.13, 124.131, 124.132, 124.137, 124.144, 124.145, 124.149, 124.153, 124.148

(56) References Cited

U.S. PATENT DOCUMENTS

| | | | | |
|---|---|---|---|---|
| 4,518,171 A | * | 5/1985 | Hedenberg | 280/6.159 |
| 4,756,550 A | * | 7/1988 | Raidel | 280/86.75 |
| 4,934,733 A | * | 6/1990 | Smith et al. | 280/124.132 |
| 5,203,585 A | * | 4/1993 | Pierce | 280/124.116 |
| 5,275,430 A | * | 1/1994 | Smith | 280/6.151 |
| 5,326,128 A | * | 7/1994 | Cromley, Jr. | 280/656 |
| 5,427,404 A | * | 6/1995 | Stephens | 280/124.162 |
| 5,458,359 A | * | 10/1995 | Brandt | 280/124.111 |
| 5,678,845 A | * | 10/1997 | Stuart | 280/124.116 |
| 6,089,583 A | * | 7/2000 | Taipale | 280/124.13 |
| 6,257,597 B1 | * | 7/2001 | Galazin | 280/6.151 |
| 6,328,322 B1 | * | 12/2001 | Pierce | 280/124.131 |
| 6,428,027 B1 | * | 8/2002 | Stuart | 280/124.157 |

* cited by examiner

Primary Examiner—David R. Dunn
Assistant Examiner—Toan C To
(74) Attorney, Agent, or Firm—Cook, Alex, McFarron, Manzo, Cummings & Mehler, Ltd.

(57) ABSTRACT

A non-torque reactive air suspension exhibiting excellent roll stability characteristics is shown to include frame hangers mounted to frame rails extending longitudinally on opposite sides of a vehicle. Longitudinally extending beams are connected to the frame hangers at one end and extend parallel to the frame rails. At their other ends, the beams are joined by a crossbrace extending laterally across the vehicle centerline. In a central portion thereof, the beams have an axle pivot bore to which an axle clamp assembly is connected, the axle clamp assembly clamping a drive axle housing for the vehicle. The axle pivot bore is generally aligned with the drive axle. A control rod assembly is connected to suspension or frame components. Together with the beams, the control rod assembly forms a parallelogram configuration wherein the beams form the lower linkages of that configuration and the control rods included within the control rod assembly form the upper linkages of that configuration.

81 Claims, 6 Drawing Sheets

VEHICLE SUSPENSION

BACKGROUND OF THE INVENTION

The present invention relates generally to innovations and improvements in vehicle suspensions. More particularly, the present invention relates to a new and improved vehicle suspension that does not react significantly to torsional forces produced by high-torque drivetrain such as those utilized in heavy-duty trucks and the like, yet exhibits excellent ride and handling characteristics.

For several reasons, including use of higher horsepower engines and advances in engine technology, there have been increases in the torque output of heavy-duty truck engines. Such increases have magnified the problems of driveline vibration associated with trailing arm air suspensions, which are inherently torque reactive. When increased torque is applied to the axle of a truck equipped with such a torque reactive suspension, such as during acceleration, the frame of the truck rises up and away from the drive axle. This condition is known and referred to in the art as "frame rise".

It has been found that driveline vibration in vehicles, particularly heavy-duty trucks, is generally proportional to the severity of frame rise and wheel hop, and vice versa. Further, it has been found according to this invention that means for and methods of preventing or minimizing frame rise will result in suppressing driveline vibration and wheel hop.

Various non-reactive drive axle suspensions are known in the art. The term "non-reactive" means that the suspension does not react appreciatively to torque applied to a drive axle, particularly during acceleration and deceleration (braking).

Various roll stable suspensions are also known in the art. The term "roll stable" means that a suspension adequately resists the tendency of a vehicle to roll when negotiating sharp turns. A suspension exhibiting that feature is said to have roll stability.

Various air suspensions are also known. The term "air suspension" refers to a suspension equipped with air springs or bellows for supporting a vehicle on an axle.

Before the present invention, the various known air suspensions have not adequately managed the mobility versus stability tradeoff. Most air suspensions that are adequately roll stable do not provide adequate mobility. Conversely, most air suspensions that provide mobility do not provide sufficient roll stability. Further, such suspensions have reduced the comfort and ride characteristics of the suspension.

It is also desirable for a suspension to maintain the axle inclination angle or "pinion" angle throughout the full range of axle travel. By doing this, the axle pinion angle will more closely match the drive shaft angle and by so doing minimizes driveline vibration. The parallelogram geometry created by the beam and control rod maintains the pinion angle where a trailing arm suspension does not.

These prior art non-torque reactive suspensions are also generally heavy, translating into reduced payload capacity in commercial vehicle applications. Such suspensions are also generally expensive to manufacture in terms of increased component parts and they require lengthy installation and assembly time, which further increases their manufacturing expense. The prior art non-torque reactive suspensions also have generally low roll stability, thereby limiting use of the vehicle to certain, limited applications.

In light of the foregoing, it is desirable to design a vehicle suspension that will overcome one or more of the above-identified deficiencies of conventional non-torque reactive suspensions.

It is further desirable to design a vehicle suspension that is non-torque reactive.

It is further desirable to design a vehicle suspension that is a non-torque reactive air suspension.

It is further desirable to design a vehicle suspension that minimizes loads into the vehicle frame and its associated cross member.

It is further desirable to design a non-torque reactive suspension that exhibits excellent roll stability characteristics.

It is further desirable to design a non-torque reactive suspension that does not compromise ride and/or articulation characteristics, while providing excellent roll stability.

It is further desirable to design a vehicle suspension that minimizes the number of components required to achieve its objectives.

It is further desirable to design a vehicle suspension that can be assembled and installed in a relatively short amount of time.

It is further desirable to design a vehicle suspension that is relatively light in weight, thereby translating into increased payload capacity when used in commercial vehicle applications.

It is further desirable to provide a rear drive axle air suspension suitable for applications requiring partial off highway operation.

It is further desirable to design a vehicle suspension that is rated from 20,000 lb. to 23,000 lb. ground load per axle.

It is further desirable to design a vehicle suspension that can be used in connection with a variety of axle configurations, including single, tandem, or tridem axle configurations.

It is further desirable to design a vehicle suspension that is a non-reactive suspension developed for heavy-duty vehicles with high torque engines.

It is further desirable to design a vehicle suspension that minimizes vibration.

It is further desirable to design a vehicle suspension that improves ride quality.

It is further desirable to design a vehicle suspension that eliminates torque reactivity.

It is further desirable to design a vehicle suspension that includes various unique torque rod design configurations.

It is further desirable to provide a vehicle suspension that has an optimized parallelogram geometry.

It is further desirable to design a vehicle suspension that does not induce roll generated torque into the drive axle of a vehicle.

It is further desirable to design a vehicle suspension that includes a machine tapered joint for the connection between the longitudinally extending main beam sections and the laterally extending crossbrace.

It is further desirable to design a vehicle suspension that utilizes a D-shaped bar pin bushing for attachment to a single leg of the lower axle bracket used to connect various suspension components to the clamped drive axle housing.

It is further desirable to design a vehicle suspension that includes an axle clamp assembly bottom pad having shock and main beam bushing mounting structure for adjustment of the axle pinion angle.

It is further desirable to design a vehicle suspension that utilizes frame hanger components with intergrated main beam and control rod mounting features.

It is further desirable to design a vehicle suspension that utilizes an axle clamp assembly top pad having integrated control mounting and bump stop features.

It is further desirable to design a vehicle suspension that includes roll stiffness tuning capability.

It is further desirable to design a vehicle suspension having features that aid in the assembly of the bushing interface.

It is further desirable to design a vehicle suspension having a geometry that eliminates axle pinion angle change throughout the range of vertical axle travel.

It is further desirable to design a vehicle suspension having a geometry with links connected both above and below the axle to resist axle torsional displacements that are generated by braking and acceleration.

It is further desirable to design a vehicle suspension having a parallel geometry that reduces driveline vibration relative to typical trailing beam style suspensions common in the industry.

It is further desirable to design a vehicle suspension that incorporates one lateral control rod per axle to support lateral loads.

It is further desirable to design a vehicle suspension that has an alternative geometry replacing two longitudinal and one lateral control rod with a single V-rod configuration that forms the upper linkage in the parallelogram geometry of the suspension and supports lateral loads.

It is further desirable to design a vehicle suspension that has pivotal connections at the axle rather than rigid connections such that no torsional loads are transmitted into the axle, making the axle interface more robust than the typical rigid connection.

It is further desirable to design a vehicle suspension that eliminates the axle as an auxiliary roll-stabilizing component, yet obtains roll stability through various components of the suspension.

It is further desirable to design a vehicle suspension that prevents vehicle frame rise.

It is further desirable to design a vehicle suspension wherein the pivot for connecting other suspension components to the frame hanger is approximately aligned with the axle pivot.

These and other benefits of the preferred forms of the invention will become apparent from the following description. It will be understood, however, that an apparatus could still appropriate the invention claimed herein without accomplishing each and every one of these benefits, including those gleaned from the following description. The appended claims, not the benefits, define the subject matter of this invention. Any and all benefits are derived from the preferred forms of the invention, not necessarily the invention in general.

BRIEF SUMMARY OF THE INVENTION

The present invention is directed to a non-torque reactive air suspension exhibiting excellent ride and handling characteristics. The suspension includes frame hangers mounted to frame rails extending longitudinally on opposite sides of a vehicle. Longitudinally extending beams are connected to the frame hangers at one end and extend parallel to the frame rails. At their other ends, the beams are joined by a crossbrace extending laterally across the vehicle centerline. In a central portion thereof, the beams have an axle pivot bore to which an axle clamp assembly is connected, the axle clamp assembly clamping a drive axle housing for the vehicle. The axle pivot bore is generally aligned with the drive axle. A control rod assembly is connected to suspension or frame components. Together with the beams, the control rod assembly forms a parallelogram configuration wherein the beams form the lower linkages of that configuration and the control rods included within the control rod assembly form the upper linkages of that configuration.

In a preferred aspect, the frame hangers include control rod mounting features. These features permit the incorporation of longitudinally extending control rods outboard of the vehicle frame rails. The frame hangers also preferably include features that facilitate installation and assembly of the suspension components, specifically the beams.

In another preferred aspect, the top pad for the axle clamp assembly includes control rod mounting features. These features also permit the incorporation of longitudinally extending control rods outboard of the vehicle frame rails. The top pad also preferably includes a bump stop.

In still another preferred aspect, the bottom pad for the axle clamp assembly includes a single leg having a curved surface to accommodate the curved portion of a D-shaped bar pin bushing that connects the axle clamp assembly to the beam through its axle pivot bore. This construction facilitates adjustment of axle pinion angle, as desired. The bottom pad also preferably includes shock damper mounting features.

In yet another preferred aspect, the connection assembly that joins the crossbrace at corresponding beam ends includes a machine taper joint and a square-like geometry, exhibiting excellent roll stability characteristic during vehicle operation.

In alternative embodiments, the suspension can include various control rod configurations, including a first having two longitudinally extending control rods mounted on the frame hanger and axle clamp assembly outboard of the vehicle frame rails and one laterally extending control rod mounted between the drive axle housing and one of the vehicle frame rails, a second having a V-rod configuration mounted at an apex to the drive axle housing and at each end to opposite ones of the vehicle frame rails, and a third having a single longitudinally extending control rod mounted between the drive axle housing and a frame cross member extending laterally and mounted to both vehicle frame rails and a single laterally extending control rod mounted to the drive axle housing and one of the vehicle frame rails.

BRIEF DESCRIPTION OF THE SEVERAL VIEWS OF THE DRAWING

In the following detailed description, reference will frequently made to the following figures, in which like reference numerals refer to like components, and in which.

DETAILED DESCRIPTION OF THE INVENTION

Figures 1, 1A, 2:
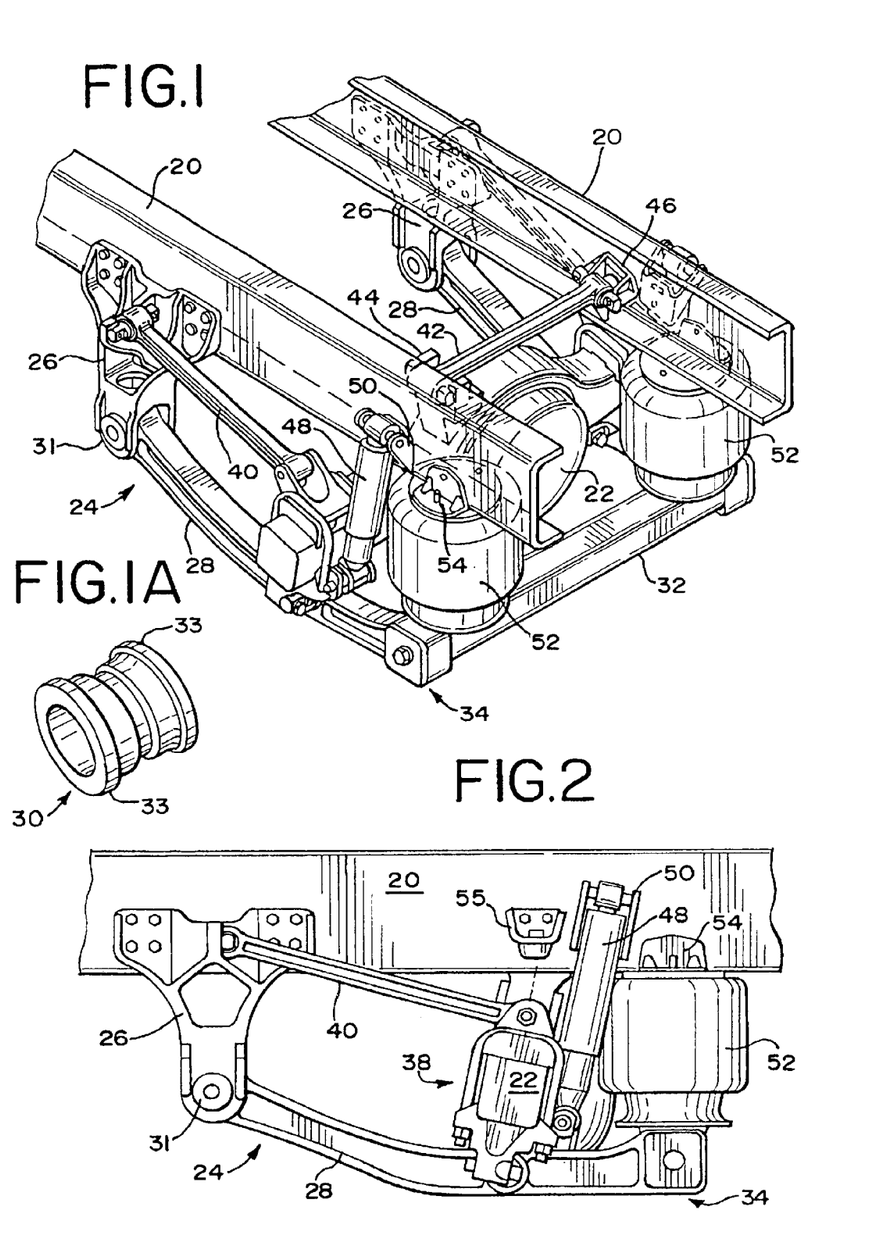
FIG. 1 is a rear perspective view of a drive axle suspension for a heavy duty truck or the like constructed in accordance with the principles of the present invention.
FIG. 1A is a perspective view of a bushing used in the suspension shown in FIG. 1.
FIG. 2 is a side elevational view of the suspension shown in FIG. 1.

FIGS. 1 and 2 illustrate components used in association with a vehicle, such as a heavy-duty truck and the like (not shown). The vehicle includes longitudinally extending frame rails 20 positioned on opposite sides of the vehicle and having a preferred C-shaped configuration. The vehicle further includes a drive axle having a housing illustrated in FIG. 1 by reference numeral 22. The drive axle for the vehicle extends laterally across the vehicle and is used to mount tires (not shown) driven by a vehicle engine (not shown).

In addition to the foregoing, the vehicle further includes a suspension generally designated by reference numeral 24, which connects the drive axle housing 22 to frame rails 20—20 positioned on opposite sides of the vehicle.

As will be appreciated, with respect to suspension 24, the majority of the components positioned on one side of the vehicle will have correspondingly similar components positioned on the other side. Accordingly, in this description, when reference is made to a particular suspension component, it will be understood that a similar component is present on the opposite side of the vehicle, unless otherwise apparent.

Suspension 24 includes a plurality of components including frame hangers 26 mounted on opposite sides of the vehicle to frame rails 20—20. Suspension 24 further includes longitudinally extending main beams 28—28 connected at one end to a frame hanger 26 through a bushing 30 (see FIG. 1A) and an eccentric washer or member 31, which allows axle adjustment for the suspension. At the other end, beams 28—28 are connected to a laterally extending crossbrace 32 by way of a beam-to-brace connection assembly 34. As shown, a single crossbrace is utilized for each axle using the suspension 24 illustrated in FIG. 1. As such, crossbrace 32 extends laterally across the vehicle to connect with the rearward ends of the beams 28—28 positioned on opposite sides of the vehicle.

Crossbrace 32 forms a semi-torsion bar which lifts and rotates while resisting moments about all three axes of a Cartesian coordinate system. Crossbrace 32 is the primary component contributing to roll stability for suspension 24.

A secondary component for the roll stability of suspension 24 is the bushing 30 that is used to connect beam 28 with frame hanger 26. Bushing 30, illustrated in FIG. 1A, preferably is a sleeveless bushing and has an outer rim surface 33 on each end thereof trapped and compressed between the beam and the inner walls of the depending panels of the frame hanger when the bushing is installed within the bore positioned at the forward end of beam 28 and beam 28 is connected to frame hanger 26. As such, this outer surface 33 of bushing 30 reacts against vehicle roll as the vehicle negotiates sharp turns and the trapped conical rate of the bushing provides additional roll stability.

Between their ends, beams 28—28 include an axle pivot bore 36 (see FIG. 3), which permits an axle clamp assembly generally designated by reference numeral 38 to connect the drive axle housing 22 to each beam 28 for pivotal movement. The axle pivot bore 36 is positioned at the center of the drive axle. The combination of beam and control rod linkages to the axle make the suspension non-reactive. Details of the axle clamp assembly 38 are set forth in further detail in the description regarding other figures of the drawing.

Further shown in FIGS. 1 and 2 is a longitudinally extending control or torque rod 40 that is connected between frame hanger 26 and a component part of axle clamp assembly 38. As such, two longitudinal torque rods 40—40 are included within suspension 24, each positioned on an opposite side of the vehicle. Together, torque rods 40 and beams 28 form a parallelogram geometry that contributes to the desired characteristics exhibited by suspension 24. The optimized geometry distributes loads between the torque rods 40 and beams 28 so that they are shared. The load distribution, handling characteristics and roll stability of suspension 24 can be tuned by varying the geometry thereof.

Similarly, a laterally extending control or torque rod 42 is included within suspension 24 and connected between drive axle housing 22 and frame rail 10 on one side of the vehicle. Laterally extending torque rod 42 extends in a direction generally transverse to the direction in which longitudinally extending torque rods 40—40 extend. Accordingly, laterally extending torque rod 42 can also be referred to as a transverse torque rod.

An axle housing control rod mounting bracket 44 is mounted to drive axle housing 22 in order to permit the laterally extending torque rod 42 to connect to the drive axle housing. Similarly, a frame rail control rod mounting bracket 46 is mounted to frame rail 10 on one side of the vehicle to permit laterally extending torque rod 42 to connect to the frame rail on which it mounts.

Suspension 24 further includes a shock damper 48 connected at its upper end to an upper shock bracket 50 mounted to frame rail 20 and at its lower end to the axle clamp assembly 38, as discussed in further detail in the description regarding other figures of the drawing. Suspension 24 further includes air springs 52—52 connected at their respective top ends to an air spring mounting bracket 54 that is mounted to frame rail 20. Air springs 52 are positioned on crossbrace 32 in a manner known in the art such as by being seated on a conventional, suitable air spring mounting pad (not shown).

Figure 13:
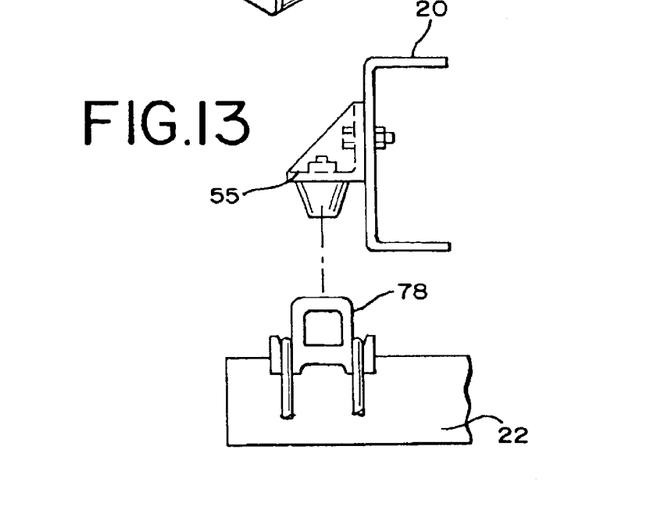
FIG. 13 is a rear view illustrating features of the suspension shown in FIG. 2.

FIG. 2 and FIG. 13 also illustrate an outboard bump stop 55 mounted on frame rail 20. As will be understood by those skilled in the art, in certain applications, air will be exhausted from the suspension to ride on bump stops. For instance, this is done to increase vehicle stability during events such as tipping a dump body to unload. The top pad 78 will strike bump stop 55 during jounce and the vertical load will pass through the top pad directly into the clamped drive axle. Top pad 178 of FIG. 9 could also be used for this purpose.

Figures 3, 4, 4A, 4B, 5:
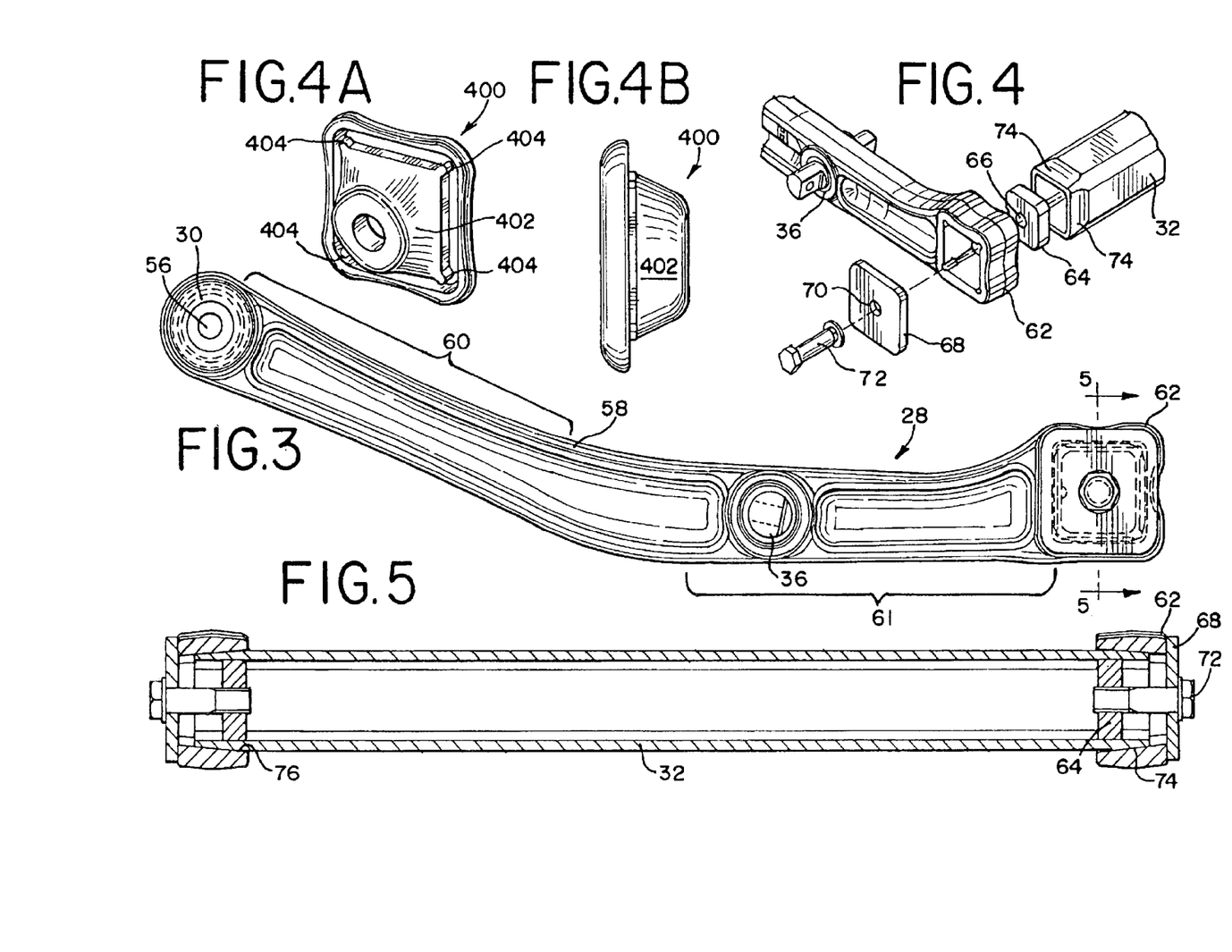
FIG. 3 is a side elevational view of one of the main beams used in the suspension shown in FIG. 1.
FIG. 4 is an exploded perspective view illustrating the connection between the main beam shown in FIG. 3 and the crossbrace used in the suspension shown in FIG. 1.
FIG. 4A is a rear perspective view of a retainer cup that can be used in the connection assembly shown in FIG. 4.
FIG. 4B is a side view of the retainer cup shown in FIG. 4A.
FIG. 5 is a sectional view of the main beam shown in FIG. 3 taken along line 5—5.

FIG. 3. illustrates one of the longitudinally extending beams 28 used in the suspension 24 depicted in the FIG. 1. As shown, beam 28 includes a bore 56 positioned at one end thereof in order to permit installation of bushing 30 (FIG. 1A) and attachment of beam 28 to frame hanger 26 (FIG. 1). From that end, beam 28 extends downwardly at a relatively continuous angle towards a point 58 to define a section 60 of the beam. From point 58, beam 28 curves upwards towards a direction where it travels along a relatively straight and horizontally extending path to define a section 61 of the beam. Beam 28 obtains the horizontally extending path at or near the axle pivot bore 36 located in a central, rearward portion of the beam. From axle pivot bore 36, beam 28 extends generally horizontally to an open, square-like end 62 designed to receive and permit connection with the crossbrace 32 depicted in FIG. 1.

FIGS. 4 and 5 illustrate the connection assembly 34 used to connect the end of each longitudinally extending beam 28 with an associated end of crossbrace 32 to establish a joint between same. During operation of suspension 24, it will be appreciated that this joint will be subjected to high bending moments about all three axes of a three dimensional Cartesian coordinate system.

Connection assembly 34 preferably includes a plug component 64 having a bore 66, a retainer plate 68 also having a bore 70, and a fastener 72. Plug component 64 is secured within the interior of hollow crossbrace 32. It will be appreciated that in an alternative arrangement plug component 64 could be integrally formed with crossbrace 32 during the manufacturing process.

Retainer plate 68 is brought into contact with the outboard, square-like surface of end 62 of beam 28 to axially align bores 66, 70. Once aligned, fastener 72 is inserted through bores 66, 70 and the joint is formed between beam 28 and crossbrace 32 by drawing the crossbrace end towards the beam end. It will be appreciated that bore 66 can be tapped in order to facilitate formation of the joint between beam 28 and crossbrace 32. Other fastening arrangements can also be used.

Still referring to FIGS. 4 and 5, crossbrace 32 includes inwardly tapered surfaces 74 defining the walls at each end. Similarly, the square-like end 62 of beam 28 has a tapered surface 76 defining each of its inner walls. Preferably, the tapered surfaces 74, 76 form a six degree angle. Inwardly tapered surfaces 74 of crossbrace 32 and inwardly tapered surfaces 76 of beam 28 are designed to allow corresponding ones of the surfaces to mate and cause frictional contact during vehicle operation. This frictional contact and squared geometry of the joint resists the torsional loads about the lateral axis of crossbrace 32. This characteristic provides exceptional roll stability for suspension 24. FIG. 5 does not illustrate the air spring mounts positioned in close proximity to the ends of crossbrace 32. However, it will be appreciated that such mounts are positioned at those locations.

FIGS. 4A and 4B illustrate a retainer cap 400 used in lieu of the retainer plate 68 shown in FIGS. 4 and 5. Retainer cap 400 is a casting having a cavity 402 that allows the fastener bolt head to be recessed, which provides increased tire clearance. Additionally, the retainer cap 400 includes bumps 404 positioned on the inboard side in each of its four corners to engage the corresponding corner of beam 28 and properly index the cap, while preventing it from rotating.

Figure 6:
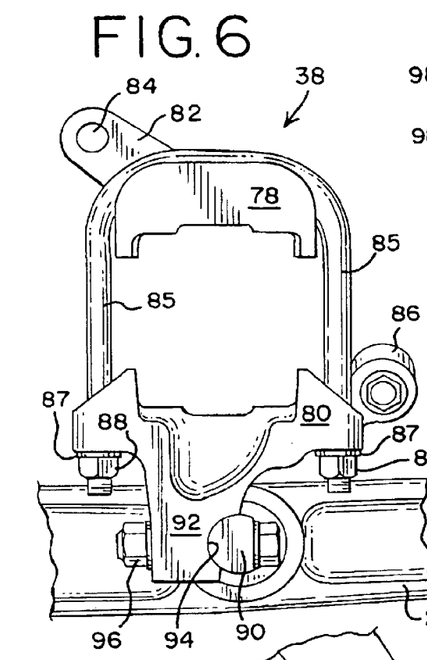
FIG. 6 is a side elevational view of a preferred form of the axle clamp assembly used in the suspension in FIG. 1.

FIG. 6 illustrates axle clamp assembly 38 having a top pad 78 and a bottom pad 80. Top pad 78 includes two projecting ears 82 having bores 84 extending through them. As shown in FIG. 1, longitudinally extending torque rod 40 can connect to axle clamp assembly 38, and particularly to top pad 78, by use of this structure. In that regard, a through bolt or the like can be inserted through axially aligned bores 84 to permit connection with longitudinally extending torque rod 40. In a conventional arrangement, top pad 78 includes grooved surfaces (not shown) designed to receive U-bolts 85 and permit clamping of the drive axle housing. U-bolts 85 are preferably three-quarter inch.

Figure 6A:
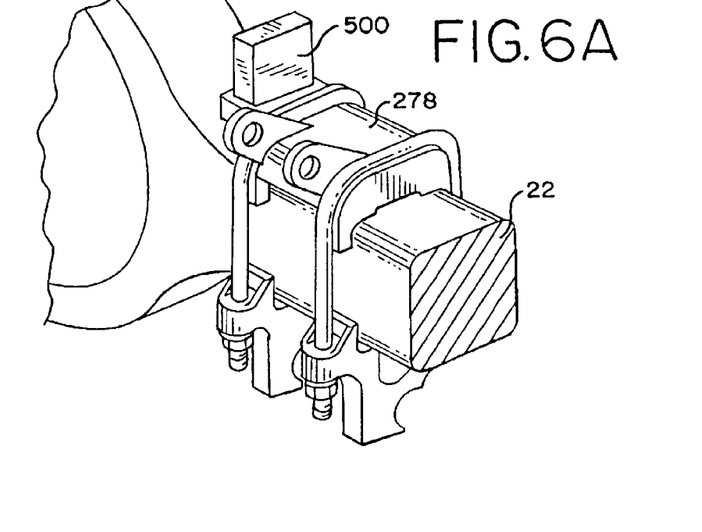
FIG. 6A is a perspective view of an alternative form of the axle clamp assembly shown in FIG. 6.

FIG. 6A illustrates an axle clamp assembly having a top pad 278 that includes the control rod mounting feature, described above. Top pad 278 also includes a bump stop 500 positioned inboard that will hit the underside of the frame rail during jounce and pass vertical load directly into the drive axle housing. As shown, bump stop 500 is integrated with top pad 278, which desirably reduces the number of suspension component parts.

Referring back to FIG. 6, bottom pad 80 includes a lower shock bracket 86 integrally formed therewith. Lower shock bracket 86 permits attachment of the lower end of a shock damper such as shock damper 48 illustrated in FIG. 1. As such, the shock damper can be connected between axle clamp assembly 38 and the vehicle frame rail. As shown, bores 87 are machined or cast into bottom pad 80 to allow U-bolts 85 to clamp the vehicle drive axle housing. Fasteners 88 are threaded onto the ends of U-bolts 85 to clamp the axle housing between the top pad 78 and bottom pad 80 of axle clamp assembly 38.

Bottom pad 80 is pivotally connected to longitudinally extending beam 28 by a D-shaped bar pin bushing 90, which is received within axle pivot bore 36. Bottom pad 80 includes a lower portion 92 defining a single leg and having a curved surface 94 that receives the curved portion of D-shaped bar pin bushing 90. Lower portion 92 also has a bore machined through it that is brought into registration with the bore machined into D-shaped bar pin bushing 90. Fastener assembly 96 includes a rod-like element that extends through the bore machined through lower portion 92 of bottom pad 80 and the bore machined through D-shaped bar pin bushing 90. Fastener assembly 96 is then fastened to connect the clamped drive axle housing to longitudinally extending beam 28, and bear against the flat surface of D-shaped bar pin bushing 90. Through this arrangement, the axle pinion angle can be readily adjusted.

Figure 7:
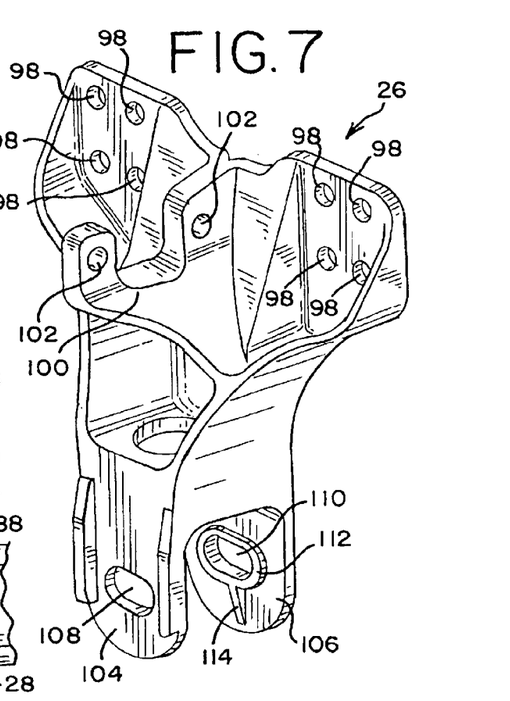
FIG. 7 is a rear perspective view of the frame hanger assembly used in the suspension shown in FIG. 1.

FIG. 7 illustrates a frame hanger 26 preferably used in the suspension 24 illustrated in FIG. 1. As shown, frame hanger 26 preferably includes mounting bores 98, which permit the frame hanger to be mounted to a vehicle frame rail. Frame hanger 26 further includes a control rod mounting flange 100 having bores 102 machined through it to permit connection with a longitudinally extending torque rod 40 by use of a bar pin or the like. Accordingly, frame hanger 26 includes control rod mounting features integrated therewith, which provides a natural path for longitudinal loads from the axle to the frame.

Referring still to FIG. 7, another unique aspect of frame hanger 26 is structure that facilitates installation and connection of the bushing 30 (FIG. 1A) used to connect an end of longitudinally extending beam 28 to the frame hanger. In that regard, frame hanger 26 includes two depending panels 104, 106 each having a bore 108, 110 machined through it. An inwardly projecting surface 112 is disposed around the perimeter of bore 110 of depending panel 106. In similar fashion, an inwardly projecting surface (not shown) is disposed around the perimeter of bore 108 of depending panel 104. An inwardly tapering surface 114 extends from the inner wall of depending panel 106 to inwardly projecting surface 112. Similarly, an inwardly tapering surface (not shown) extends from the inner wall of depending panel 104 to the inwardly projecting surface that is disposed about the perimeter of bore 108. As will be appreciated by those skilled in the art, this construction greatly facilitates assembly of the longitudinally extending beam 28 to frame hanger 26 by allowing the bushing to be positioned in registration with bores 108, 110 more readily.

Ideally, bores 108, 110 are aligned vertically with axle 22 to provide optimum performance of suspension 24. As hanger 26 hangs lower, however, it is greater in weight, provides less clearance, and requires more expense to manufacture. In any event, the characteristics of suspension 24 can be tuned by varying the position of the main beam pivot vis-a-vis the axle pivot.

To assemble the components illustrated in FIGS. 1 and 2, frame hangers 26, frame rail control rod mounting brackets 46 and upper shock damper mounting brackets 50 are mounted to frame rails 20 to form a frame subassembly. The axle clamp assembly 38 is then clamped to drive axle housing 22, while beams 28 are connected to crossbrace 32 and connected to the axle clamp assembly by D-shaped bar pin bushing 90. The longitudinally extending control rods 40 are connected to the top pads 78 for each axle clamp assembly 38, and the laterally extending control rod 42 is connected to the axle housing control rod mounting bracket 44 mounted on drive axle housing 22 to form an axle subassembly. Thereafter, the axle subassembly is installed into the frame subassembly. Finally, the eccentric washer or member 31 is rotated clockwise or counter-clockwise to move the drive axle forward or rearward, as desired. Further, drop in shims (not shown) can be added at the longitudinal torque rod and frame hanger interface, as desired.

Figure 8:
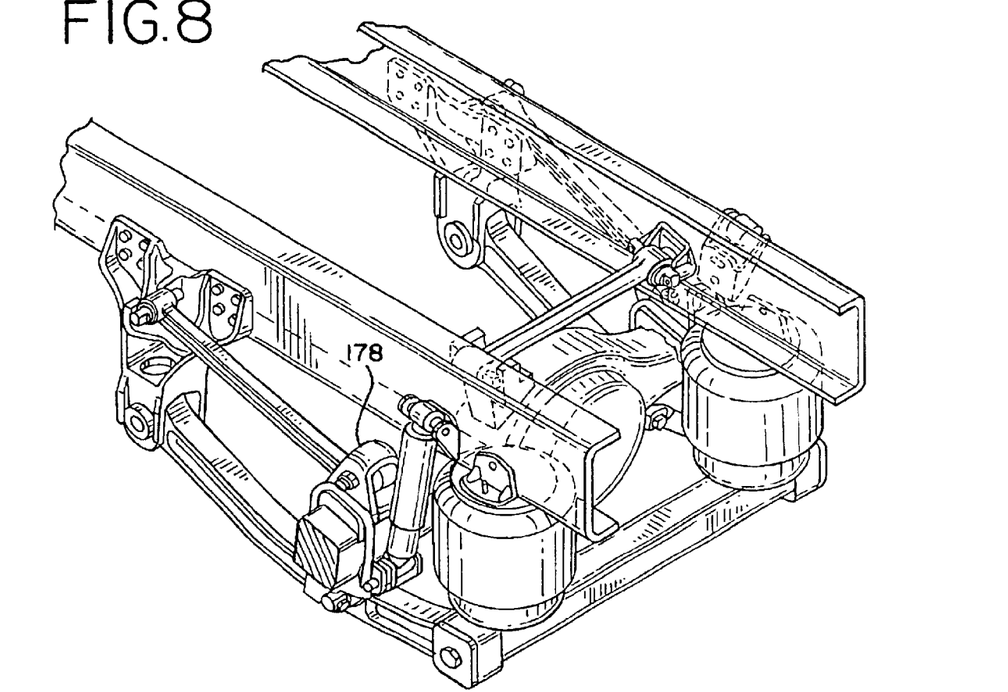
FIG. 8 is a rear perspective view of the suspension shown in FIG. 1 having its axle clamp assembly top pad substituted for an alternative preferred form of that component.

FIG. 8 also illustrates a vehicle suspension having a geometry identical to that shown in FIG. 1. In the suspension shown in FIG. 8, the axle clamp assembly includes a top pad 178 having a different construction from that depicted in FIGS. 1, 2 and 6.

Figure 9:
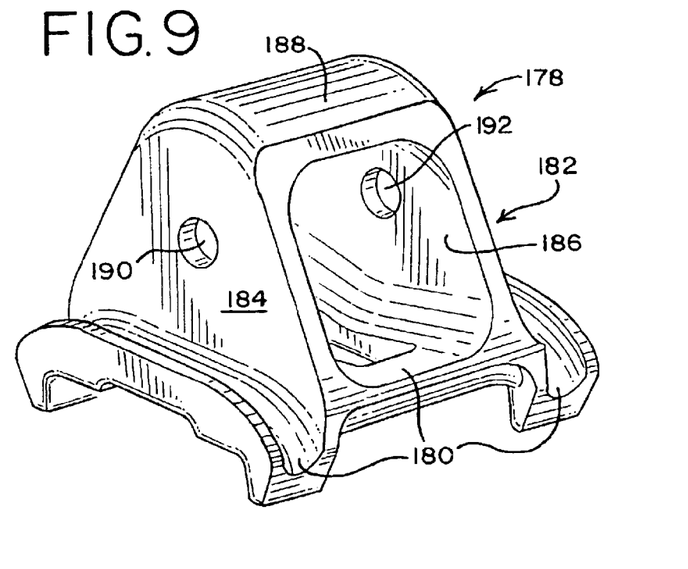
FIG. 9 is a rear perspective view of the axle clamp assembly top pad included within the suspension shown in FIG. 8.

Referring to FIG. 9, top pad 178 includes an axle clamp base portion 180 and a control rod mounting portion generally designated by reference numeral 182. Control rod mounting portion 182 includes two ear-like sidewalls 184, 186 and a curved top wall or dome surface 188, which can serve as a bearing surface that strikes a bump stop mounted on the vehicle frame rail. Openings exist between sidewalls 184, 186 at opposite ends of the top pad to permit entry of a control rod.

Sidewall 184 includes a bore 190 machined or cast through it. Similarly, sidewall 186 includes a bore 192 machined or cast through it. Bores 190, 192 are in registration such that a pin can extend between them and through a bore positioned at one end of a longitudinally extending control rod such as control rod 40 depicted in FIG. 8. Accordingly, similar to the top pad 78 shown in FIG. 6, top pad 178 has control rod mounting features intergrated therewith. As will be appreciated, top pad 178 might be more structurally sound, but top pad 78 is lighter in weight because it ordinarily would require less material.

Figure 10:
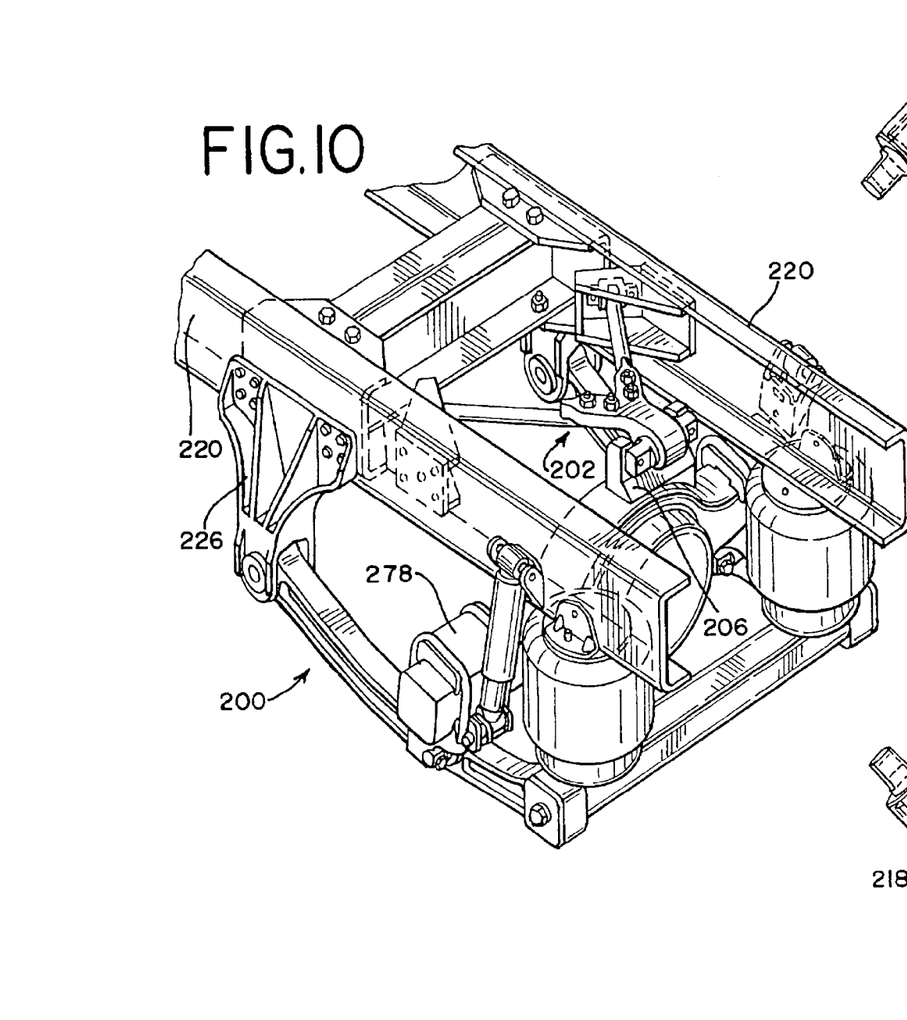
FIG. 10 is a rear perspective view of the suspension shown in FIG. 1 having an alternative control rod configuration.

FIG. 10 illustrates a suspension generally designated 200 that utilizes a V-shaped control rod configuration defined by a V-shaped control rod assembly generally designated 202. In that regard, frame hanger 226 and top pad 278 can be conventional in design, and need not have control rod mounting features associated and intergrated therewith. V-shaped control rod assembly 202 connects to frame rails 220 by way of frame brackets 204 mounted thereon, and further connects with drive axle housing 222 by way of a bracket 206 mounted on the housing. It will be appreciated by those skilled in the art that V-shaped control rod assembly 202 reacts to both lateral and longitudinal forces produced during vehicle operation, and that it provides the upper links for the preferred parallelogram geometry used for the roll stable, non-torque reactive vehicle suspension of the present invention.

Figure 11:
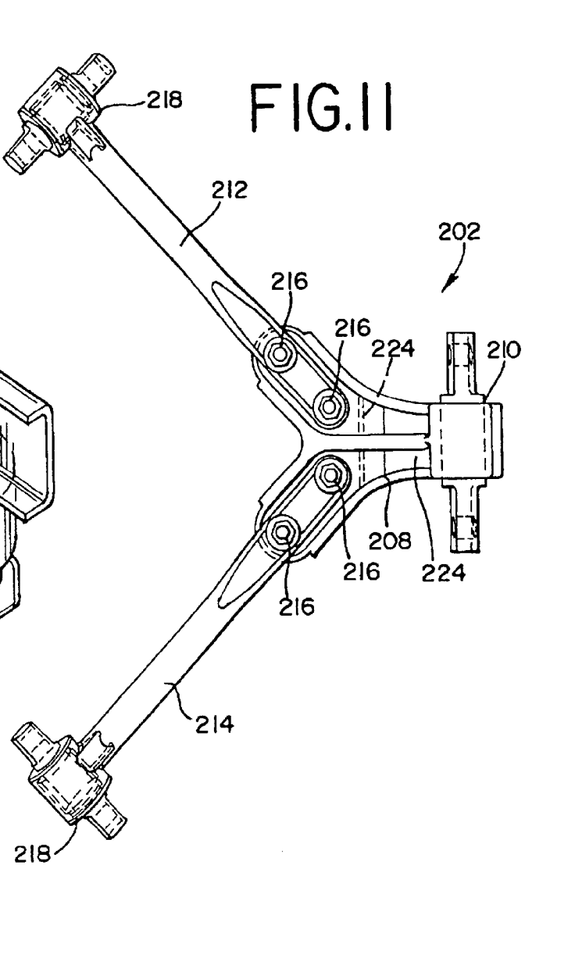
FIG. 11 is a top plan view of the alternative control rod configuration used in the suspension shown in FIG. 10.

FIG. 11 illustrates V-shaped control rod assembly 202. Assembly 202 includes an apex component 208 having a bushing 210 for connection with bracket 206 on the drive axle housing 222. Assembly 202 further includes control rods 212, 214 fastened to apex component 208 by fasteners 216. Control rods 212, 214 include bushings 218 for attachment to frame brackets 204 mounted on opposing frame rails 222 that extend longitudinally along opposite sides of the vehicle. Apex component 208 includes two recessed portions 224 defining channels that permit connection with control rods 212, 214 and direct them along their desired path, orientating them towards frame rails 220.

Figure 12:
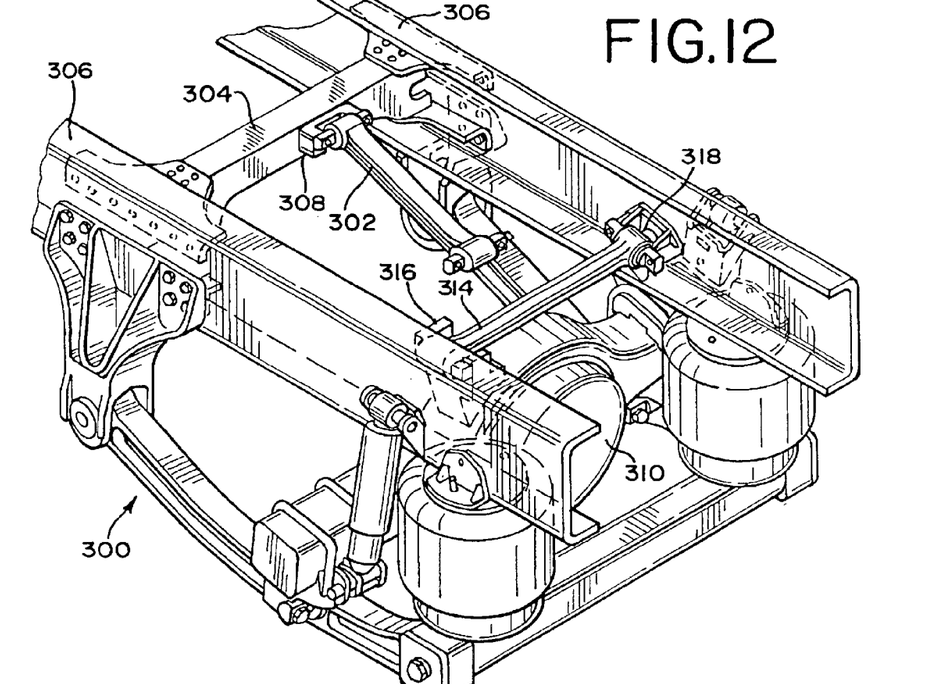
FIG. 12 is a rear perspective view of the suspension shown in FIG. 1 having yet another alternative control rod configuration.

FIG. 12 illustrates a suspension generally designated 300 that utilizes a two rod control rod configuration. In that regard, a longitudinally extending control rod 302 connects to a cross member 304 of frame rails 306 by way of a frame bracket 308 mounted to the cross member, and further connects with drive axle housing 310 by way of bracket (not shown) mounted on the housing. This connection is not shown to facilitate illustration of this control rod configuration. Similarly, a laterally extending control rod 314 connects to one frame rail 306 by way of a frame bracket 316 mounted thereon, and further connects with drive axle housing 310 by way of a bracket 318 mounted on the housing. It will be appreciated by those skilled in the art that control rod 302 reacts to longitudinal torque forces produced during vehicle operation, and control rod 314 reacts to lateral torque forces produced during vehicle operation. Togther, control rods 302, 314 provide the upper links for the preferred parallelogram geometry used for the roll stable, non-torque reactive vehicle suspension of the present invention.

While this invention has been described with reference to certain illustrative embodiments, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

What is claimed is:

1. A non-torque reactive, roll stable vehicle air suspension connecting a vehicle drive axle housing to vehicle frame rails extending longitudinally on opposite sides of a vehicle, comprising:

frame hangers mounted to the frame rails;

longitudinally extending beams connected to the frame hangers at beam first ends defining lower linkages of a parallelogram configuration for the suspension, each beam having an axle pivot bore positioned at a central portion thereof, each beam also having a beam second end having a substantially square portion;

a laterally extending crossbrace being connected to the substantially square portions of the beam second ends by a connection assembly;

axle clamp assemblies connected to the beams at axle pivot bores thereof and clamping the drive axle housing at opposite ends thereof; and a control rod assembly having at least one control rod connected between the drive axle housing and one of the vehicle frame rails to define upper linkages of the parallelogram configuration for the suspension.

2. The suspension defined by claim 1 wherein the connection assembly comprises a machined taper joint.

3. The suspension defined by claim 1 wherein the axle clamp assembly includes a single leg having a curved surface to accommodate a curved portion of a D-shaped bar pin bushing that connects the axle clamp assembly to the beam through its axle pivot bore.

4. The suspension defined by claim 1 wherein the axle clamp assembly includes shock damper mounting features.

5. The suspension defined by claim 1 wherein the axle clamp assembly includes control rod mounting features.

6. The suspension defined by claim 1 wherein the axle clamp assembly includes a bump stop.

7. The suspension defined by claim 1 wherein the frame hanger includes integrated beam and control rod mounting features.

8. The suspension defined by claim 1 wherein the frame hanger includes features facilitating assembly of the beam.

9. The suspension defined by claim 1 wherein the control rod assembly includes two longitudinally extending control rods mounted on the frame hanger and axle clamp assembly outboard of the vehicle frame rails and one laterally extending control rod mounted between the drive axle housing and one of the vehicle frame rails.

10. The suspension defined by claim 1 wherein the control rod assembly includes a V-rod configuration mounted at an apex to the drive axle housing and at each end to opposite ones of the vehicle frame rails.

11. The suspension defined by claim 1 wherein the control rod assembly includes a longitudinally extending control rod mounted between the drive axle housing and a frame cross member extending laterally and mounted to the vehicle frame rails and a single laterally extending control rod mounted to the drive axle housing and one of the vehicle frame rails.

12. The suspension defined by claim 1 wherein the parallelogram configuration maintains a pinion angle associated with the drive axle housing.

13. The suspension defined by claim 1 wherein said suspension exhibits roll stiffness tuning capability.

14. The suspension defined by claim 1 wherein said longitudinally extending beams are below the drive axle housing and said at least one control rod is above the drive axle housing.

15. The suspension defined by claim 1 wherein said suspension is designed to eliminate the drive axle housing as an auxiliary roll-stabilizing component.

16. The suspension defined by claim 1 wherein said suspension is designed to prevent vehicle frame rise.

17. The suspension defined by claim 1 wherein each of said frame hangers have frame hanger pivots approximately aligned with the axle pivot bore of a respective one of the longitudinally extending beams.

18. The suspension defined by claim 1 further comprising a first air spring mounted between a first end of said laterally extending crossbrace and a vehicle frame rail adjacent to said first end of the laterally extending crossbrace, and a second air spring mounted between a second end of said laterally extending crossbrace and a vehicle frame rail adjacent to said second end of the laterally extending crossbrace.

19. A non-torque reactive, roll stable vehicle air suspension connecting a vehicle drive axle housing to vehicle frame rails extending longitudinally on opposite sides of a vehicle comprising:

frame hangers mounted to the frame rails;

longitudinally extending beams connected to the frame hangers at beam first ends defining lower linkages of a parallelogram configuration for the suspension, each beam having an axle pivot bore positioned at a central portion thereof, each beam also having a beam second end having a substantially square portion;

a laterally extending crossbrace being connected to the substantially square portions of the beam second ends by a connection assembly;

axle clamp assemblies connected to the beams at axle pivot bores thereof and clamping the drive axle housing at opposite ends thereof;

a first longitudinally extending control rod mounted between one of the axle clamp assemblies and one of the frame hangers;

a second longitudinally extending control rod mounted between another of the axle clamp assemblies and another of the frame hangers;

a laterally extending control rod mounted between the drive axle housing and one of the vehicle frame rails.

20. The suspension defined by claim 19 wherein the connection assembly comprises a machined joint taper.

21. The suspension defined by claim 19 wherein the axle clamp assembly includes a single leg having a curved surface to accommodate a curved portion of a D-shaped bar pin bushing that connects the axle clamp assembly to the beam through its axle pivot bore.

22. The suspension defined by claim 19 wherein the axle clamp assembly includes shock damper mounting features.

23. The suspension defined by claim 19 wherein the axle clamp assembly includes a bump stop.

24. The suspension defined by claim 19 wherein the frame hanger includes features facilitating assembly of the beam.

25. The suspension defined by claim 19 wherein the parallelogram configuration maintains a pinion angle associated with the drive axle housing.

26. The suspension defined by claim 19 wherein said suspension exhibits roll stiffness tuning capability.

27. The suspension defined by claim 19 wherein said longitudinally extending beams are below the drive axle housing and said first and second longitudinally extending control rods are above the drive axle housing.

28. The suspension defined by claim 19 wherein said suspension is designed to eliminate the drive axle housing as an auxiliary roll-stabilizing component.

29. The suspension defined by claim 19 wherein said suspension is designed to prevent vehicle frame rise.

30. The suspension defined by claim 19 wherein each of said frame hangers have frame hanger pivots approximately aligned with the axle pivot bore of a respective one of the longitudinally extending beams.

31. The suspension defined by claim 19 further comprising a first air spring mounted between a first end of said laterally extending crossbrace and a vehicle frame rail adjacent to said first end of the laterally extending crossbrace, and a second air spring mounted between a second end of said laterally extending crossbrace and a vehicle frame rail adjacent to said second end of the laterally extending crossbrace.

32. A non-torque reactive, roll stable vehicle air suspension connecting a first end of a vehicle drive axle housing to a first vehicle frame rail extending longitudinally on one side of a vehicle and a second end of a vehicle drive axle housing to a second vehicle frame rail extending longitudinally on another side of the vehicle, comprising:
 a first frame hanger mounted to the first vehicle frame rail;
 a second frame hanger mounted to the second vehicle frame rail;
 a first longitudinally extending beam connected to the first frame hanger at a first end of the first beam and having an axle pivot bore positioned at a central portion thereof;
 a second longitudinally extending beam connected to the second frame hanger at a first end of the second beam and having an axle pivot bore positioned at a central portion thereof, the first and second longitudinally extending beams defining lower linkages of a parallelogram configuration for the suspension;
 a laterally extending crossbrace having a first end thereof connected to a second end of the first longitudinally extending beam and having a second end thereof connected to a second end of the second longitudinally extending beam, the laterally extending crossbrace being connected to the second ends by first and second connection assemblies;
 a first axle clamp assembly connected to the first beam at its axle pivot bore and clamping the first end of the drive axle housing;
 a second axle clamp assembly connected to the second beam at its axle pivot bore and clamping the second end of the drive axle housing;
 a first longitudinally extending control rod mounted between the first axle clamp assembly and the first frame hanger;
 a second longitudinally extending control rod mounted between the second axle clamp assembly and the second frame hanger;
 a laterally extending control rod mounted between the drive axle housing and one of the first and second vehicle frame rails;
 a first air spring positioned on said crossbrace adjacent to the first end of said crossbrace; and
 a second air spring positioned on said crossbrace adjacent to the second end of said crossbrace.

33. The suspension defined by claim 32 wherein the first connection assembly comprises a machined joint taper.

34. The suspension defined by claim 32 wherein the first axle clamp assembly includes a single leg having a curved surface to accommodate a curved portion of a D-shaped bar pin bushing that connects the first axle clamp assembly to the beam through its axle pivot bore.

35. The suspension defined by claim 32 wherein the first axle clamp assembly includes shock damper mounting features.

36. The suspension defined by claim 32 wherein the first axle clamp assembly includes a bump stop.

37. The suspension defined by claim 32 wherein the first frame hanger includes features facilitating assembly of the beam.

38. The suspension defined by claim 32 wherein the parallelogram configuration maintains a pinion angle associated with the drive axle housing.

39. The suspension defined by claim 32 wherein said suspension exhibits roll stiffness tuning capability.

40. The suspension defined by claim 32 wherein said first and second longitudinally extending beams are below the drive axle housing and said first and second longitudinally extending control rods are above the drive axle housing.

41. The suspension defined by claim 32 wherein said suspension is designed to eliminate the drive axle housing as an auxiliary roll-stabilizing component.

42. The suspension defined by claim 32 wherein said suspension is designed to prevent vehicle frame rise.

43. The suspension defined by claim 32 wherein said first frame hanger has a frame hanger pivot approximately aligned with the axle pivot bore of the first longitudinally extending beam.

44. A non-torque reactive, roll stable vehicle air suspension connecting a vehicle drive axle housing to vehicle frame rails extending longitudinally on opposite sides of a vehicle, comprising:
 frame hangers mounted to the frame rails;
 longitudinally extending beams connected to the frame hangers at beam first ends defining lower linkages of a parallelogram configuration for the suspension, each beam having an axle pivot bore positioned at a central portion thereof;
 a laterally extending crossbrace being connected to beam second ends having a substantially square portion by a connection assembly;
 axle clamp assemblies connected to the beams at axle pivot bores thereof and clamping the drive axle housing at opposite ends thereof;
 a control rod assembly having at least one control rod connected between the drive axle housing and one of the vehicle frame rails to define upper linkages of the parallelogram configuration for the suspension; and
 wherein the axle clamp assembly includes a single leg having a curved surface to accommodate a curved portion of a D-shaped bar pin bushing that connects the axle clamp assembly to the beam through its axle pivot bore.

45. The suspension defined by claim 44 wherein the connection assembly comprises a machined taper joint.

46. The suspension defined by claim 44 wherein the axle clamp assembly includes shock damper mounting features.

47. The suspension defined by claim 44 wherein the axle clamp assembly includes control rod mounting features.

48. The suspension defined by claim 44 wherein the axle clamp assembly includes a bump stop.

49. The suspension defined by claim 44 wherein the frame hanger includes integrated beam and control rod mounting features.

50. The suspension defined by claim 44 wherein the frame hanger includes features facilitating assembly of the beam.

51. The suspension defined by claim 44 wherein the control rod assembly includes two longitudinally extending control rods mounted on the frame hanger and axle clamp assembly outboard of the vehicle frame rails and one laterally extending control rod mounted between the drive axle housing and one of the vehicle frame rails.

52. The suspension defined by claim 44 wherein the parallelogram configuration maintains a pinion angle associated with the drive axle housing.

53. The suspension defined by claim 44 wherein said suspension exhibits roll stiffness tuning capability.

54. The suspension defined by claim 44 wherein said longitudinally extending beams are below the drive axle housing and said at least one control rod is above the drive axle housing.

55. The suspension defined by claim 44 wherein said suspension is designed to eliminate the drive axle housing as an auxiliary roll-stabilizing component.

56. The suspension defined by claim 44 wherein said suspension is designed to prevent vehicle frame rise.

57. The suspension defined by claim 44 wherein each of said frame hangers have frame hanger pivots approximately aligned with the axle pivot bore of a respective one of the longitudinally extending beams.

58. The suspension defined by claim 44 further comprising a first air spring mounted between a first end of said laterally extending crossbrace and a vehicle frame rail adjacent to said first end of the laterally extending crossbrace, and a second air spring mounted between a second end of said laterally extending crossbrace and a vehicle frame rail adjacent to said second end of the laterally extending crossbrace.

59. A non-torque reactive, roll stable vehicle air suspension connecting a vehicle drive axle housing to vehicle frame rails extending longitudinally on opposite sides of a vehicle comprising:
frame hangers mounted to the frame rails;
longitudinally extending beams connected to the frame hangers at beam first ends defining lower linkages of a parallelogram configuration for the suspension, each beam having an axle pivot bore positioned at a central portion thereof;
a laterally extending crossbrace being connected to beam second ends having a substantially square portion by a connection assembly;
axle clamp assemblies connected to the beams at axle pivot bores thereof and clamping the drive axle housing at opposite ends thereof;
a first longitudinally extending control rod mounted between one of the axle clamp assemblies and one of the frame hangers;
a second longitudinally extending control rod mounted between another of the axle clamp assemblies and another of the frame hangers;
a laterally extending control rod mounted between the drive axle housing and one of the vehicle frame rails; and
wherein the axle clamp assembly includes a single leg having a curved surface to accommodate a curved portion of a D-shaped bar pin bushing that connects the axle clamp assembly to the beam through its axle pivot bore.

60. The suspension defined by claim 59 wherein the connection assembly comprises a machined joint taper.

61. The suspension defined by claim 59 wherein the axle clamp assembly includes shock damper mounting features.

62. The suspension defined by claim 59 wherein the axle clamp assembly includes a bump stop.

63. The suspension defined by claim 59 wherein the frame hanger includes features facilitating assembly of the beam.

64. The suspension defined by claim 59 wherein the parallelogram configuration maintains a pinion angle associated with the drive axle housing.

65. The suspension defined by claim 59 wherein said suspension exhibits roll stiffness tuning capability.

66. The suspension defined by claim 59 wherein said longitudinally extending beams are below the drive axle housing and said first and second longitudinally extending control rods are above the drive axle housing.

67. The suspension defined by claim 59 wherein said suspension is designed to eliminate the drive axle housing as an auxiliary roll-stabilizing component.

68. The suspension defined by claim 59 wherein said suspension is designed to prevent vehicle frame rise.

69. The suspension defined by claim 59 wherein each of said frame hangers have frame hanger pivots approximately aligned with the axle pivot bore of a respective one of the longitudinally extending beams.

70. The suspension defined by claim 59 further comprising a first air spring mounted between a first end of said laterally extending crossbrace and a vehicle frame rail adjacent to said first end of the laterally extending crossbrace, and a second air spring mounted between a second end of said laterally extending crossbrace and a vehicle frame rail adjacent to said second end of the laterally extending crossbrace.

71. A non-torque reactive, roll stable vehicle air suspension connecting a first end of a vehicle drive axle housing to a first vehicle frame rail extending longitudinally on one side of a vehicle and a second end of a vehicle drive axle housing to a second vehicle frame rail extending longitudinally on another side of the vehicle, comprising:
a first frame hanger mounted to the first vehicle frame rail;
a second frame hanger mounted to the second vehicle frame rail;
a first longitudinally extending beam connected to the first frame hanger at a first end of the first beam and having an axle pivot bore positioned at a central portion thereof;
a second longitudinally extending beam connected to the second frame hanger at a first end of the second beam and having an axle pivot bore positioned at a central portion thereof, the first and second longitudinally extending beams defining lower linkages of a parallelogram configuration for the suspension;
a laterally extending crossbrace having a first end thereof connected to a second end of the first longitudinally extending beam and having a second end thereof connected to a second end of the second longitudinally extending beam, the laterally extending crossbrace being connected to the second ends by first and second connection assemblies;
a first axle clamp assembly connected to the first beam at its axle pivot bore and clamping the first end of the drive axle housing;
a second axle clamp assembly connected to the second beam at its axle pivot bore and clamping the second end of the drive axle housing;
a first longitudinally extending control rod mounted between the first axle clamp assembly and the first frame hanger;
a second longitudinally extending control rod mounted between the second axle clamp assembly and the second frame hanger;
a laterally extending control rod mounted between the drive axle housing and one of the first and second vehicle frame rails;
a first air spring mounted between said crossbrace and said first vehicle frame rail adjacent to the first end of said crossbrace;

a second air spring mounted between said crossbrace and said second vehicle frame rail adjacent to the second end of said crossbrace; and wherein the axle clamp assembly includes a single leg having a curved surface to accommodate a curved portion of a D-shaped bar pin bushing that connects the axle clamp assembly to the beam through its axle pivot bore.

72. The suspension defined by claim 71 wherein the first connection assembly comprises a machined joint taper.

73. The suspension defined by claim 71 wherein the first axle clamp assembly includes shock damper mounting features.

74. The suspension defined by claim 71 wherein the first axle clamp assembly includes a bump stop.

75. The suspension defined by claim 71 wherein the first frame hanger includes features facilitating assembly of the beam.

76. The suspension defined by claim 71 wherein the parallelogram configuration maintains a pinion angle associated with the drive axle housing.

77. The suspension defined by claim 71 wherein said suspension exhibits roll stiffness tuning capability.

78. The suspension defined by claim 71 wherein said first and second longitudinally extending beams are below the drive axle housing and said first and second longitudinally extending control rods are above the drive axle housing.

79. The suspension defined by claim 71 wherein said suspension is designed to eliminate the drive axle housing as an auxiliary roll-stabilizing component.

80. The suspension defined by claim 71 wherein said suspension is designed to prevent vehicle frame rise.

81. The suspension defined by claim 71 wherein said first frame hanger has a frame hanger pivot approximately aligned with the axle pivot bore of the first longitudinally extending beam.

* * * * *

UNITED STATES PATENT AND TRADEMARK OFFICE
Certificate

Patent No. 6,851,689 B2                                          Patented: February 8, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ashley Thomas Dudding, Plainfield, IL (US); Christopher Wayne Forrest, Auburn, IN (US); John Wayne Suart, Chicago, IL (US); Jason Steby Thomas, Chicago, IL (US); Pedro Ramses Banda Marquez, Downers Grove, IL (US); Mark William Dankow, Ft. Wayne, IN (US); and Roger D, Jable, Naperville, IL (US).

Signed and Sealed this Twenty-sixth Day of February 2008.

PAUL N. DICKSON
*Supervisory Patent Examiner*
Art Unit 3616